Nov. 13, 1934.  A. C. SCHMOHL  1,980,442
CAR COUPLER
Filed April 29, 1931  2 Sheets-Sheet 1
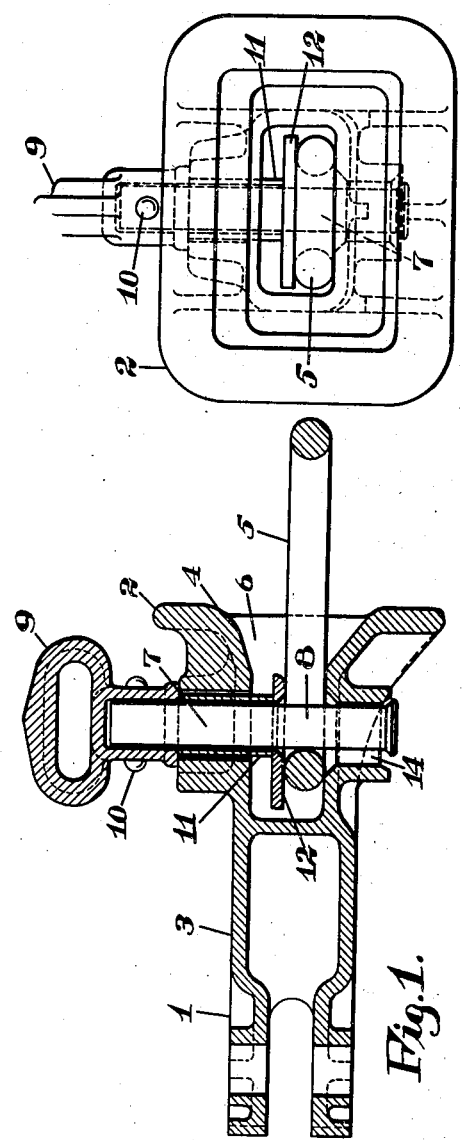
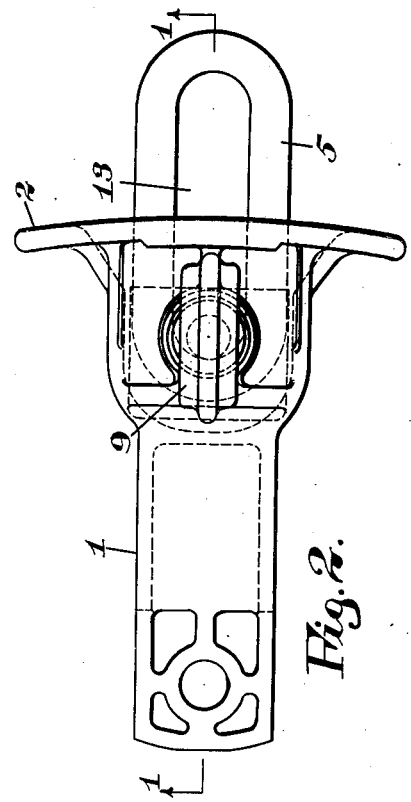
INVENTOR
Alfred C Schmohl
BY
ATTORNEY Nov. 13, 1934.  A. C. SCHMOHL  1,980,442
CAR COUPLER
Filed April 29, 1931  2 Sheets-Sheet 2
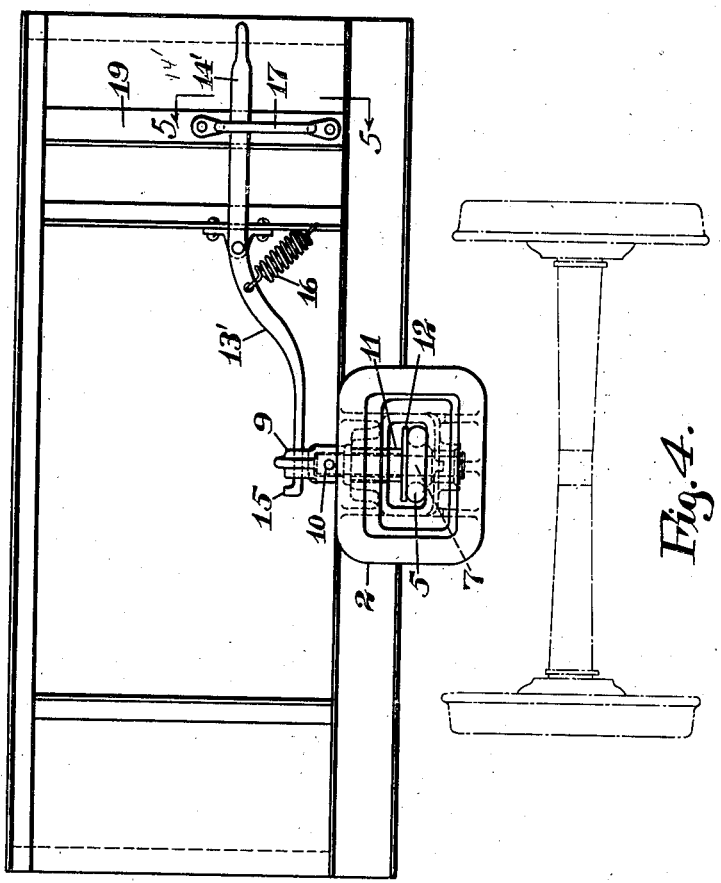
INVENTOR
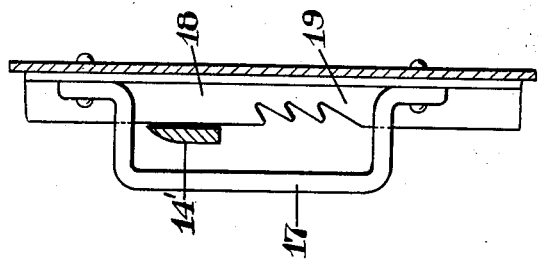
ATTORNEY Patented Nov. 13, 1934

1,980,442

UNITED STATES PATENT OFFICE 1,980,442

CAR COUPLER

Alfred C. Schmohl, Beaver Falls, Pa., assignor, by mesne assignments, to Koppel Industrial Car and Equipment Company, McKees Rocks, Pa., a corporation of Pennsylvania Application April 29, 1931, Serial No. 533,601

5 Claims. (Cl. 213—188)

An object of my invention is to provide a car coupler with means for automatically holding a coupling link in coupling position.

Another object of my invention is to provide a means for automatically retaining the coupling pin within the coupling link in all positions of the car body during operation of the car.

Referring now to the drawings, Fig. 1 shows in side elevation a cross section through a preferred form of my invention; Fig. 2 is a full plan view of the coupler shown in section in Fig. 1; Fig. 3 is a full end view of the coupler; Fig. 4 shows in elevation an end of a car embodying my invention; Fig. 5 is a section taken along the lines 5—5 of Fig. 4.

Referring now in detail to the drawings, reference character 1 indicates a coupler comprising a draw head 2 having a shank portion 3 for attaching the head to the car and a front portion 4 for the reception of a coupling link 5 and coupling pin 7. The portion 4 has an elongated opening 6 of sufficient width to permit the free entrance of the coupling link 5 and deep enough to permit the link to be engaged by a coupling pin 7 mounted therein.

The coupling pin preferably comprises a shank portion 8 and a handle portion 9, one end of the shank portion 8 being mounted within an opening in the handle portion 9 and secured therein by means of a rivet 10 or other suitable fastening means. The other end of the shank portion 8 is enlarged for a purpose which will be made clear as the description proceeds.

Suitably mounted on the shank 8 is a ferrule 11 and bearing plate 12. The ferrule 11 is of sufficient diameter to be freely movable on the shank 8 and to not pass through the opening in the plate 12 for the reception of the shank 8 of the coupling pin 7. The length of the ferrule 11 is such that when the pin 7 is inserted through the link 5 and the handle portion 9 engages with the top of the draw head 4, one end of the ferrule engages with the handle 9 and the other end bears on the plate 12 to force the link 5 into engagement with the base of the opening 6 and thus retain the link 5 in horizontal position. From an inspection of Figs. 2 and 3, it will be noted that the opening in the plate 12 for the insertion of the pin 7 is less than the outside dimensions of the enlarged portion of the end of the pin 7 and prevents separation of the plate and pin. The width of the plate 12 is less than that of the opening 11 and greater than the slot 13 in the link 5 for the reception of the pin 7.

When assembling the pin 7, ferrule 11 and plate 12 within the draw head, the shank 8 is separate from the handle 9 and the small end is inserted through the opening 14 in the lower face of the portion 4, through the plate 12, ferrule 11, the opening in the upper face of the portion 4 and into the handle 9. The pin or rivet 10 is inserted through the handle 9 and shank 8 to prevent their separation. In this manner, the pin 7 is secured within the draw head against accidental separation therefrom and as the openings 13 and 14 are large enough to permit the movement of the enlarged end of the pin 7 within the draw head, the pin can be raised and lowered to effect the engagement of the link and pin.

When the opposing ends of two cars equipped with my invention are brought together for the purpose of coupling, the pin 7 of one car remains in lowered position and maintains the link contained within its respective draw head in position to enter the opposing draw head. In this connection, it will be noted that the opening 6 in the front portion of the draw head at the extreme outer face thereof is a great deal wider than the width of the link and tapers inwardly to a position opposite the coupling pin. In this manner, the entering link tends to center itself within the draw head. As the link approaches the draw head, the handle 9 is raised until the enlarged portion of the pin 7 engages with the plate 12 so that continued upward movement of the pin lifts the plate 12 and ferrule 11 until the plate engages with the upper face of the opening 6 and provides space for the end of the entering link, after which the pin 7 is dropped through the opening 13 in the link and the handle portion of the pin forces the ferrule 11 and plate 12 into engagement with the link.

The mechanism thus far described would be operable for cars which move relatively in the same plane but where the car bodies are placed into a rotary dump which inverts the entire car to discharge lading, the inverting of the car would cause the pin 7 to move in the direction of the handle and cause separation of the pin and link within the draw head. In order to prevent this separation I have provided a means, as shown in Fig. 4, comprising a bar 13' pivotally mounted on the end of the car body and having at one end an operating handle 14' and at the other end a suitably shaped portion 15 for engagement with the handle 9 for the coupling pin 7. Mounted on the end of the car and in engagement with the member 13' is a suitably formed tension spring 16 which automatically holds the handle of the pin 7 in engagement with the draw head and prevents upward movement thereof. From this, it will be noted that when the cars are inverted, the tension spring 16 is of sufficient strength to maintain the pin 7 within the link 5. The member 13' also serves the additional purpose of providing means adjacent the side of the car body for operating the coupler pin.

It will be noted that the downward movement of the handle portion 14' tends to raise the portion 15 and attached handle 9 to cause separation of the link and pin within the draw head and upon releasing the handle, the tension spring 16 automatically returns the member 13' and pin to the position shown in Fig. 4. Secured to the end of the car body and enclosing the member 13' is a grab iron or other suitably formed guide for maintaining the member 13' in a vertical plane as the handle is moved in a vertical direction. By forming suitably shaped ratchet teeth 18 on an outstanding member 19 of the car body, the handle 14' when moved downward can be maintained in any pre-selected position by engagement of the member 14' within one of the teeth 18 of the member 19. This feature is of particular value when in a train of cars it is desired to retain a number of the coupling pins in uncoupling position.

Having thus described my invention what I claim as new and desire to secure by Letters Patent is:—

1. In a car coupler, in combination, a drawhead, a coupling link, an opening in the face of said drawhead for the reception of the coupling link, a plate within the opening adapted to rest upon said link, a ferrule connected to said plate slidably mounted within the drawhead, and a coupling pin adapted to extend through said ferrule, plate and coupling link.

2. In a car coupler, in combination, a drawhead, a coupling link, an opening in the face of said drawhead for the reception of the coupling link, a plate within the opening adapted to rest upon said link, a ferrule connected to said plate slidably mounted within the drawhead, a coupling pin adapted to extend through said ferrule, plate and coupling link, and means on said coupling pin adapted to engage said plate.

3. In a car coupler, in combination, a drawhead, a coupling link, an opening in the face of said drawhead for the reception of the coupling link, a plate within the opening adapted to rest on said link, a ferrule connected to said plate slidably mounted within the drawhead, a coupling pin extending through the ferrule, plate and coupling link, and a head secured to said pin adapted to rest upon the ferrule, thereby holding the plate against the coupling link.

4. In a car coupler, in combination, a drawhead, a coupling link having a slot therein, an opening in the face of said drawhead for the reception of the coupling link, a plate within the opening adapted to rest upon said link, said plate being of less width than the opening and of greater width than said slot, a ferrule connected to said plate slidably mounted within the drawhead and a coupling pin extending through the ferrule, plate and coupling link.

5. In a car coupler, in combination, a drawhead, a coupling link, an opening in the face of said drawhead for the reception of the coupling link, an opening in said drawhead rearwardly of the face thereof, a plate within the first-named opening adapted to rest upon said link, a ferrule connected to said plate and slidably mounted within the latter-named opening and a coupling pin extending through the ferrule, plate and coupling link.

ALFRED C. SCHMOHL.